US012743405B2

(12) United States Patent
Wick et al.

(10) Patent No.: US 12,743,405 B2
(45) Date of Patent: Sep. 22, 2026

(54) SIMILARITY ANALYSIS USING ENHANCED MINHASH

(71) Applicant: Oracle International Corporation, Redwood City, CA (US)

(72) Inventors: Michael Louis Wick, Burlington, MA (US); Jean-Baptiste Frederic George Tristan, Burlington, MA (US); Swetasudha Panda, Burlington, MA (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 18/426,100

(22) Filed: Jan. 29, 2024

(65) Prior Publication Data

US 2024/0168934 A1 May 23, 2024

Related U.S. Application Data

(63) Continuation of application No. 16/436,770, filed on Jun. 10, 2019, now Pat. No. 11,921,687.

(51) Int. Cl.

| | |
|---|---|
| ***G06F 16/22*** | (2019.01) |
| ***G06F 17/18*** | (2006.01) |
| ***G06F 18/22*** | (2023.01) |
| ***G06F 18/231*** | (2023.01) |

(52) U.S. Cl.

CPC .......... *G06F 16/2228* (2019.01); *G06F 17/18* (2013.01); *G06F 18/22* (2023.01); *G06F 18/231* (2023.01)

(58) Field of Classification Search

CPC .................................................. G06F 16/2228

USPC ......................................................... 708/200

See application file for complete search history.

(56) References Cited

U.S. PATENT DOCUMENTS

| | | | | |
|---|---|---|---|---|
| 11,068,453 | B2 * | 7/2021 | Griffith | G06F 16/2456 |
| 2021/0004582 | A1 | 1/2021 | Evans et al. | |

OTHER PUBLICATIONS

Author: Oprisa , Title “A MinHash Approach for Clustering Large Collections of Binary Programs”, publisher: 20th International Conference on Control System and Science (Year: 2015).*

Author: Ciprian Opris,a; Title: A MinHash Approach for Clustering Large Collections of Binary Programs; Publisher: 2015 20th International Conference on Control Systems and Science; Pertinent pp. 157-163 (Year: 2015).*

(Continued)

*Primary Examiner* — Syling Yen

(74) *Attorney, Agent, or Firm* — Robert C. Kowert; Kowert, Hood, Munyon, Rankin & Goetzel, P.C.

(57) ABSTRACT

A first set and a second set are identified as operands for a set operation of a similarity analysis task iteration. Using respective minimum hash information arrays and contributor count arrays of the two sets, a minimum hash information array and contributor count array of a derived set resulting from the set operation is generated. An entry in the contributor count array of the derived set indicates the number of child sets of the derived set that meet a criterion with respect to a corresponding entry in the minimum hash information array of the derived set. The generated minimum hash information array and the contributor count array are stored as part of input for a subsequent iteration. After a termination criterion of the task is met, output of the task is stored.

20 Claims, 8 Drawing Sheets

(56) References Cited

OTHER PUBLICATIONS

Andrei Z. Broder et al, "Min-Wise Independent Permutations" dated Jun. 22, 1998, pp. 1-30.
Andrew McCallum et al, "Toward Conditional Models of Identity Uncertainty with Application to Proper Noun Coreference", 2003, pp. 1-7.
Ari Kobren et al, "A Hierarchical Algorithm for Extreme Clustering", Aug. 13-17, 2017, pp. 1-10.
Devdatt P. Dubhashi et al, "Concentration of Measure for the Analysis of Randomised Algorithms", Sep. 7, 2006, pp. 1-207.
Dimitris Achlioptas, "Database-friendly random projections: Johnson-Lindenstrauss with binary coins", Aug. 28, 2001, pp. 1-17.
Gurmeet Singh Manku et al, "Detecting Near-Duplicates for Web Crawling", 2007, pp. 1-9.
Hui Han et al, "Two Supervised Learning Approaches for Name Disambiguation in Author Citations", 2004, pp. 1-10.
Jure Leskovec et al, "Mining of Massive Datasets", 2014, pp. 1-16.
Jonathan Raiman et al, "DeepType: Multilingual Entity Linking by Neural Type System Evolution", 2018, pp. 1-8.
Joseph Tassarotti et al, "Sketching for Latent Dirichlet-Categorical Models", Oct. 2, 2018, pp. 1-20.
Karthik Raghunathan et al, "A Multi-Pass Sieve for Coreference Resolution", 2010, pp. 1-10.
Kenton Lee et al, "End-to-End Neural Coreference Resolution", Dec. 15, 2017, pp. 1-10.
Kilian Weinberger et al, "Feature Hashing for Large Scale Multitask Learning", Feb. 27, 2010, pp. 1-10.
Manzil Zaheer et al, "Exponential Stochastic Cellular Automata for Massively Parallel Inference", 2016, pp. 1-10.
Michael Wick et al, "A Discriminative Hierarchical Model for Fast Coreference at Large Scale", 2012, pp. 1-10.
Moses S. Charikar, "Similarity Estimation Techniques from Rounding Algorithms", 2002, pp. 1-9.
N. Halko et al, "Finding Structure with Randomness: Probabilistic Algorithms for Constructing Approximate Matrix Decompositions", Dec. 14, 2010, pp. 1-74.
Nathan Dowlin et al, "CryptoNets: Applying Neural Networks to Encrypted Data with High Throughput and Accuracy", 2016, pp. 1-10.
Piotr Indyk et al, "Approximate Nearest Neighbors: Towards Removing the Curse of Dimensionality", Jul. 21, 1999, pp. 1-21.
Sam Wiseman et al, "Learning Global Features for Coreference Resolution", Apr. 11, 2016, pp. 1-11.
William B. Johnson et al, "Extensions of Lipschitz Mappings into a Hilbert Space", 1984, pp. 1-18.
C. Oprisa, "A MinHash Approach for Clustering Large Collections of Binary Programs," 2015 20th International Conference on Control Systems and Computer Science, 2015, pp. 157-163, doi: 10.1109/CSCS.2015.27. (Year: 2015).
0. Ertl, "SuperMinHash—A New Minwise Hashing Algorithm for Jaccard Similarity Estimation" arXiv: 1706.05698 (Year: 2017).

* cited by examiner

SIMILARITY ANALYSIS USING ENHANCED MINHASH

PRIORITY APPLICATION

This application is a continuation of U.S. patent application Ser. No. 16/436,770, filed Jun. 10, 2019, which is hereby incorporated by reference herein in its entirety.

BACKGROUND

Estimating the similarity between two sets or feature vectors is a fundamental operation underlying many types of computation tasks. For example, similarity analysis is used in many areas of machine learning, including clustering, nearest neighbor search, classification, kernel methods for support vector machines, and the like. Often, similarity analysis techniques have to be applied to sparse, high dimensional and dynamically changing feature representations. Especially in limited memory environments, re-computing similarity scores (such as Jaccard similarity coefficients) directly from the underlying high dimensional data sets may be computationally intractable when the data sets change repeatedly during inference (e.g., as cluster membership is changed by moving elements in and out of clusters). A number of space-efficient techniques for representing large data sets, including various kinds of locality-sensitive hashing schemes such as MinHash, have been devised. While the MinHash algorithm can be used for generating compact representations of large data sets from which Jaccard similarity estimates for the sets can be obtained, preserving Jaccard similarity estimates in scenarios in which the MinHash representations have to be updated (due to changes in the underlying set memberships) remains a non-trivial technical challenge.

SUMMARY

Various embodiments of systems, apparatus and methods for similarity analysis using any of several enhanced versions of the MinHash algorithm are described. According to some embodiments, a method may comprise performing one or more iterations of a similarity analysis task with respect to a plurality of entities at one or more computing devices. A given iteration of the task may comprises identifying, from a plurality of sets using a minimum hash based similarity score, a first set and a second set as operands for a set operation. Individual ones of the plurality of sets may represent one or more entities of the plurality of entities, and the minimum hash based similarity score may be obtained without applying a hash function to at least one set of the first and second sets. The method may further comprise generating, using respective minimum hash information arrays corresponding to the first and second sets and respective contributor count arrays corresponding to the first and second sets, (a) a minimum hash information array of a derived set, where the derived set is obtained by applying the set operation to the first and second operand sets and (b) a contributor count array of the derived set. An entry at a particular index in the contributor count array may be indicative of a count of child sets of the derived set whose minimum hash information array meets a criterion with respect to an entry at the particular index in the minimum hash information array for the derived set. The method may also include storing, as part of an input for a subsequent iteration of the task, the generated minimum hash information array and the generated contributor count array. After a task termination criterion has been met, an indication of a result of the similarity analysis task may be provided.

In one embodiment, a system may comprise one or more computing devices. The devices may include instructions that upon execution on or across one or more processors perform one or more iterations of a similarity analysis task with respect to a plurality of entities. A given iteration of the task may comprises identifying, from a plurality of sets, a first set and a second set as operands for a set operation. Individual ones of the plurality of sets may represent one or more entities of the plurality of entities. The instructions, upon execution, may generate, using respective minimum hash information arrays corresponding to the first and second sets and respective contributor count arrays corresponding to the first and second sets, (a) a minimum hash information array of a derived set, where the derived set is obtained by applying the set operation to the first and second operand sets and (b) a contributor count array of the derived set. An entry at a particular index in the contributor count array may be indicative of a count of child sets of the derived set whose minimum hash information array meets a criterion with respect to an entry at the particular index in the minimum hash information array for the derived set. The instructions, upon execution, may also store the generated minimum hash information array and the generated contributor count array as part of an input for a subsequent iteration of the task. After a task termination criterion has been met, an indication of an output of the similarity analysis task may be transmitted.

According to at least some embodiments, one or more non-transitory computer-accessible storage media may store program instructions that when executed on or across one or more processors perform one or more iterations of a similarity analysis task with respect to a plurality of entities. A given iteration of the task may comprises identifying, from a plurality of sets, a first set and a second set as operands for a set operation. Individual ones of the plurality of sets may represent one or more entities of the plurality of entities. The program instructions, when executed, may generate, using respective minimum hash information arrays corresponding to the first and second sets and respective contributor count arrays corresponding to the first and second sets, (a) a minimum hash information array of a derived set, where the derived set is obtained by applying the set operation to the first and second operand sets and (b) a contributor count array of the derived set. An entry at a particular index in the contributor count array may be indicative of a count of child sets of the derived set whose minimum hash information array meets a criterion with respect to an entry at the particular index in the minimum hash information array for the derived set. The program instructions, when executed, may also store the generated minimum hash information array and the generated contributor count array as part of an input for a subsequent iteration of the task. After a task termination criterion has been met, an indication of an output of the similarity analysis task may be stored.

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION OF EMBODIMENTS

Figure 1:
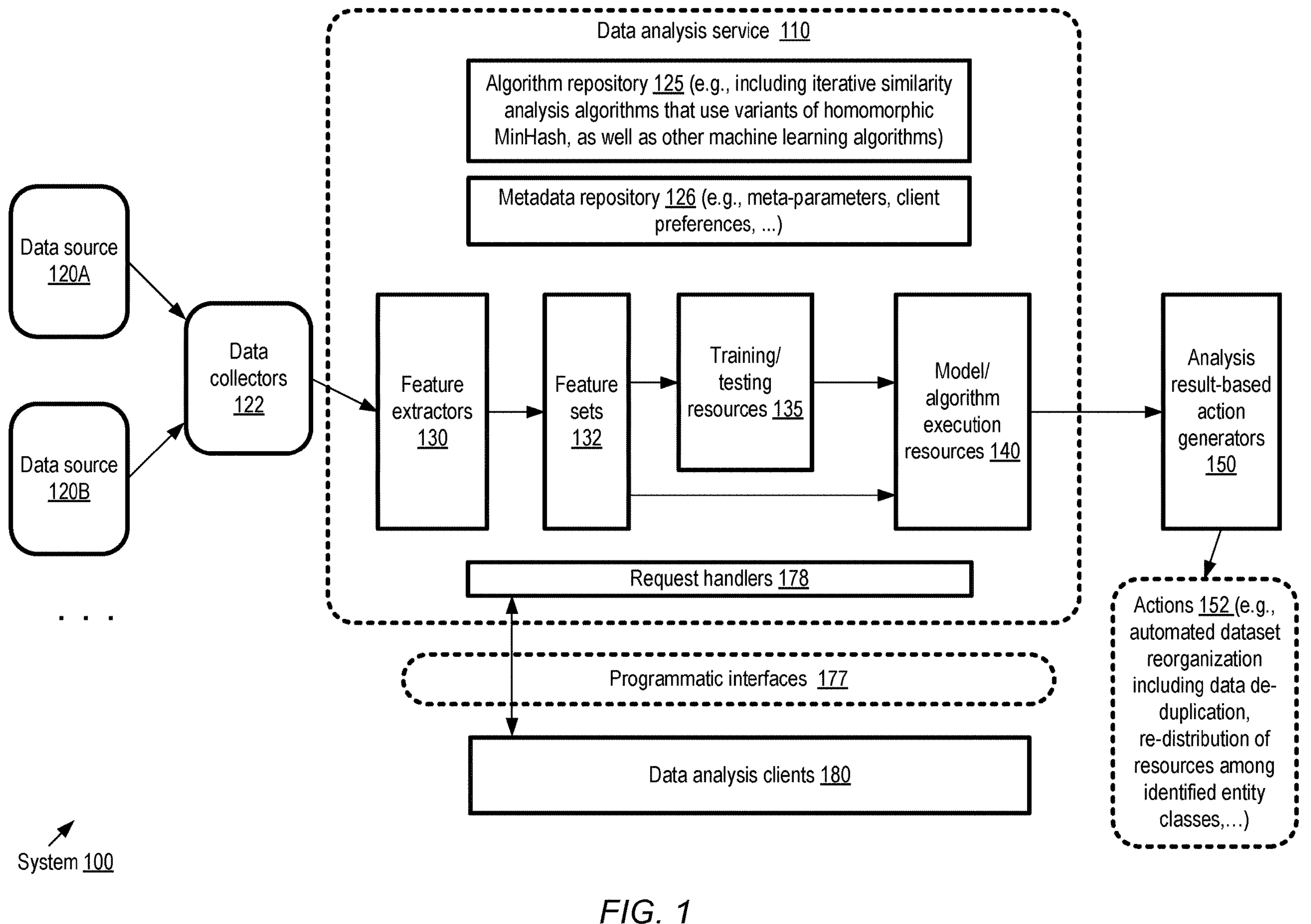
FIG. 1 illustrates an example system environment in which one or more enhanced MinHash algorithms may be implemented to enable a variety of similarity analysis tasks to be performed, according to at least some embodiments.

FIG. 1 illustrates an example system environment in which one or more enhanced MinHash algorithms may be implemented to enable a variety of similarity analysis tasks to be performed, according to at least some embodiments. To appreciate the enhancements to MinHash, it may be worthwhile to first describe the underlying MinHash technique. The baseline MinHash technique, of which several enhanced versions are described herein, is a locality-sensitive hashing technique often used for estimating Jaccard similarity, defined for binary vectors or encoding sets. The Jaccard similarity J between two sets $S_1, S_2 \in \Omega$ is the ratio of the cardinality of the intersection of the sets to the cardinality of the union of the sets: $J=(|S_1 \cap S_2|)/(|S_1 \cup S_2|)$. In baseline MinHash, a random permutation $\pi: \Omega \rightarrow \Omega$ is applied on the elements of a given set S (e.g., using a random hash function such as a seeded 64-bit murmur hash), and then the minimum value $h_\pi(S)=\min(\pi(S))$, which is called the MinHash value of S, is extracted to represent S in a compact manner. The probability that the MinHash function for a random permutation of a set computes the same value for two sets is equal to the Jaccard similarity of the two sets. Formally, $$Pr(h_\pi(S_1) = h_\pi(S_2)) = (|S_1 \cap S_2|) / (|S_1 \cup S_2|) = J$$

In practice, n different hash functions may be used to obtain a vector or array of n minimum values, $v^S=[h_{\pi 0}(S), h_{\pi 1}(S), \ldots, h_{\pi n-1}(S)]$ for a set S. The Jaccard similarity estimate $J^\wedge$ for two sets $S_1$ and $S_2$ may then be obtained as $$J^\wedge = (1/n)\sum_{i=1,n} \mathbb{1}[(h_{\pi i}(S_1) = h_{\pi i}(S_2))]$$

The variance of this estimate is $\mathrm{Var}(J^\wedge)=(1/n)J(1-J)$. Variance may thus be reduced by increasing the number of hash functions n.

In various embodiments, the baseline MinHash technique discussed above may be enhanced by endowing MinHash with homomorphic properties using auxiliary metadata as described below, allowing the MinHash representations of sets to be efficiently updated to support union and difference set operators while preserving the ability to estimate Jaccard similarity. The enhanced versions of MinHash may therefore be referred to as homomorphic MinHash algorithms in various embodiments. For numerous types of iterative machine learning tasks (such as clustering-related tasks or co-reference resolution tasks), the membership of data sets being analyzed may be modified from one iteration to the next, with larger sets being constructed from the union of smaller sets generated in an earlier stage if certain criteria with respect to set similarity are met, and/or with some sets being divided into subsets based on other similarity or dissimilarity criteria. The sets themselves (often containing feature vectors representing groups of entities with respect to which similarity is being analyzed) may be very high dimensional and often sparse; as such, the ability of the enhanced techniques to support union and difference set operators without requiring the minimum hash values to be re-computed from scratch for the modified or derived sets may be extremely beneficial. The details of the auxiliary information maintained, and the formulas used to for the computations of Jaccard estimates and the like, differ among the various versions of enhanced MinHash described below.

As one skilled in the art will appreciate in light of this disclosure, certain embodiments in which one or more of the described enhanced MinHash techniques are implemented may be capable of achieving various advantages and practical benefits, including enabling similarity analysis tasks to be completed to a desired level of convergence or accuracy more rapidly, and with fewer resources (e.g., smaller amounts of memory) or time being consumed than may be possible using conventional techniques. Alternatively, for a given amount of time or resources, the enhanced techniques may provide more accurate similarity analysis results compared to conventional techniques (e.g., more epochs through a large data set may be completed within a time period T using the enhanced MinHash techniques than may be completed using conventional techniques). Example results indicating some of the benefits achieved from one homomorphic MinHash technique are discussed below in conjunction with the description of FIG. 6.

As shown in FIG. 1, system 100 may comprise resources and artifacts of a data analysis service 110, including among others an algorithm repository 125, a metadata repository

126, feature extractors 130, training/testing resources 135 for various types of machine learning models or algorithms, execution resources 140 for trained versions of the models/algorithms, as well request handlers 178 responsible for responding to programmatic messages submitted by data analysis clients 180. The algorithm repository 125 may, for example, include a number of iterative similarity analysis algorithms that utilize variants of homomorphic MinHash, as well as numerous other machine learning algorithms in the depicted embodiment. The repositories 125 and 126, feature extractors 130, training/testing resources 135, execution resources 140 and request handlers 178 may each comprise some combination of hardware and software components or devices in different embodiments. The data analysis service 110 may implement a set of programmatic interfaces 177, such as a set of application programming interfaces (APIs), command line tools, graphical user interfaces, web-based portals or consoles, and the like, which may be used by clients to submit requests for various types of analysis and machine learning tasks, obtain results of the requested tasks, and so on.

For various analysis tasks that may be requested by clients 180 via programmatic interfaces 177, the raw data to be analyzed may be collected from a variety of data sources 120 (e.g., 120A and 120B) by a set of data collectors 122. Data sources 120A and 120B may, for example, comprise a variety of environmental sensors, computing devices that generate log entries, content producers generating text or media objects or documents, and so on. In some embodiments, the data collectors 122 may capture the raw data from the sources 120 and perform some amount of data cleansing or reformatting, converting the raw data into a form from which feature sets 132 can be generated by the feature extractors 130. In one embodiment, the data collectors 122 may be implemented as a subsystem within the data analysis service. The specific data structures used for the feature sets (e.g., high-dimensional binary data vectors) may be chosen based on the type of analysis task requested by the clients, and/or based on the specific algorithms being used for the task in various embodiments.

The extent to which detailed guidance regarding a requested analysis task is provided by a client 180 of service 110 may vary from one client to another and from one task to another. In some embodiments, for example, a client 180 may simply indicate the source data (e.g., by identifying one or more data sources 120 and a criterion for identifying entities on which similarity analysis is to be performed) and a high-level objective, such as the equivalent of "sub-divide this set of documents into categories based on subject matter similarity". In other embodiments, in addition to indicating the objective, a client may also use the programmatic interfaces 177 to specify the particular algorithm to be used (e.g., one of the homomorphic MinHash algorithms), meta-parameters and parameters of the algorithm, resource usage limits for the task, and so on. In one embodiment, for example, in which a homomorphic MinHash is to be used for a desired iterative similarity analysis task, a client 180 may indicate threshold similarity or dissimilarity criteria to be used to decide whether a set operation of a particular type (e.g., union or set difference) should be performed on a pair of candidate operand sets, termination criteria for the task as a whole and/or for individual iterations of the task, a destination or transmission mechanism for output of the task, the number of hash functions to be used, the data sources from which the inputs for the task are to be obtained, and so on. In at least some embodiments, such preferences or meta-parameters may be stored in a metadata repository 126 on behalf of various clients. In scenarios in which a client does not provide parameters or meta-parameters that are required for a given task (e.g., convergence criteria for terminating the task, or resource usage limits for the task), the service 110 may use default values, or heuristics may be used to determine the values. A wide variety of similarity analysis tasks may be implemented using the homomorphic MinHash algorithm(s) in different embodiments, including for example classification tasks, co-reference resolution tasks, nearest neighbor search tasks, the generation of similarity matrices for kernel methods of a support vector machine or other machine learning algorithms, etc.

The requested similarity analysis task may be conducted on behalf of the client 180 at the service 110, using an appropriate combination of training/testing resources 135 and/or model execution resources 140. In some cases, the requested task may comprise only the training of a model, or only the execution of an already-trained model. In at least some embodiments in which the tasks are inherently iterative, intermediate results may be generated in each iteration—e.g., a collection of documents or objects represented by respective feature sets may be tentatively categorized into subsets in each iteration of a clustering task. After a result corresponding to a particular iteration is found to meet a termination or convergence criterion (e.g., if the similarity scores of identified clusters have plateaued during some number of recent iterations), the task may be considered complete, and indications of the output of the task may be stored or provided/transmitted to one or more destinations. In the embodiment depicted in FIG. 1, some results may be provided to automated action generators 150 implemented at one or more computing devices. As such, the similarity-analysis based task may represent one component of an automated workflow or pipeline, with actions being initiated automatically based on the results produced by the homomorphic MinHash or other machine learning algorithm. The specific actions 152 that are initiated may of course vary from one task to another. In one use case, for example, the actions 152 may include a reorganization or cleansing of a dataset, in which duplicate data items (identified using a selected MinHash algorithm) are removed from the dataset. In another use case, a plurality of entities represented by respective feature sets 132 may have been categorized or re-categorized into some number of classes which differ from one another in the average amount of resources available to the entities in the individual classes, and a resource re-distribution action 152 may be initiated.

For many of the types of tasks performed at data analysis 110, a homomorphic MinHash algorithm may be employed. In many iterative tasks such as clustering or hierarchical co-reference resolution, in which intermediate data sets are constructed using union or difference set operators, and the decision to apply an operator to a given pair of operand sets is based on a similarity score, the homomorphic MinHash algorithm selected in various embodiments may have to support at least three functions or methods: a UNION function, a DIFFERENCE function, and a SCORE function. For example, in a clustering use case, the UNION and DIFFERENCE functions may allow the clustering algorithm to merge (in the UNION case) or split (in the DIFFERENCE case) clusters to test out different possible clustering alternatives, and the SCORE function may help govern decisions about whether to split or merge (or terminate the analysis). High-level pseudocode for portions of a simplified clustering algorithm is provided in pseudocode set PS0 below.

```
--------Start pseudo-code set PS0 for simple clustering algorithm-----------
function CLUSTER (input data points X)
    # initialize clusters
    for x_i in X do
        S_i ← {x_i} // initial clusters are singletons

    # initialize hash information and auxiliary metadata/statistics
    for all clusters S_i do
        h_πk(S_i) ← MinHash(S_i) # obtain MinHash values for each cluster
        c_k^Si = 1 # initialize counts to 1

    # start clustering iterations/epochs
    for epochs in 0, 1, 2, . . . do
        # optionally perform other computations of clustering algorithm
        for operand set index pairs in 0, 1, 2, . . .
            select specific pair of operand sets (S_i, S_j)
            if SCORE(S_i, S_j) > threshold1 then
                # replace S_i with merge result and update counts
                S_i ← UNION(S_i, S_j)
            if SCORE(DIFFERENCE(S_i, S_j), S_j) < threshold2 then
                # replace S_i with split result and update counts
                S_i ← DIFFERENCE(S_i, S_j)
        # optionally perform other computations of clustering algorithm,
        # such as more complex data set re-arrangements based on
        scores
        if epoch termination criteria are met
            terminate epoch
        if clustering termination criteria are met
            exit from CLUSTER function; provide current sets as output
--------End pseudo-code set PS0-------------------------------
```

A set of input data points X is to be categorized into clusters based on similarity of the data points in PS0. In lines 3 and 4 of PS0, data points of an input data set are assigned to singleton clusters (note that in some embodiments the initial sets need not necessarily be limited to single-element sets; for example, sets of up to K randomly-selected elements may be created, or heuristics may be used to generate at least some multi-element sets). In lines 7-8, conventional or baseline MinHash is run for each data point to initialize a hash information array for each of the initialized clusters; the number of elements in the array is equal to the number of hash functions being used. Furthermore, in line 9, auxiliary metadata in the form of a contributor count array (of the same dimensionality as the hash information array) is initialized, with all elements of the contributor count being set to 1. Details of how the contributor count information may be updated and used in various embodiments for the different homomorphic MinHash algorithms are provided below in additional examples of pseudo code.

After the initialization phase is completed, clustering iterations or epochs are begun in line 12 of PS0. In each iteration, the current input data sets (initially all singletons in the first iteration) are analyzed to determine whether any rearrangements of the data among the sets is to be performed. For example, a selected number of pairs $S_i$ and $S_j$ of the sets are considered as candidates, one pair at a time, for possible UNION (merge) or DIFFERENCE (split) operations. If the similarity score (obtained via the SCORE function invocation in line 16) for a given pair of operand sets exceeds a threshold (threshold1), a decision to merge the two operand sets and replace one ($S_i$) with the derived merged set may be made (line 18). The derived merged set may thus grow larger due to the accumulation of similar data subsets. Similarly, if a subset that was previously added to construct a larger merged set is sufficiently different from the remainder of the merged set (as determined via the SCORE function in line 19), the previously-merged set may be split (line 21). One of the operand sets Si of the DIFFERENCE function of line 21 may be replaced by the split result (with the less-similar portion of the original operand set being removed, this again increasing overall intra-cluster similarity). Note that while different score thresholds (threshold1 and threshold2) are shown in PS0 for the decisions regarding UNION and DIFFERENCE, in some embodiments the thresholds need not be different. The counts and the minimum hash information for the derived sets (results of merges or splits) may be updated without having to apply hash functions to the set elements in various embodiments. Termination conditions for individual epochs and the overall clustering algorithm are checked in lines 24 and 26; such conditions may for example be based on the total amount of computation and/or memory resources that have been consumed so far during the execution of CLUSTER function, the total time that has elapsed so far, or the rate at which the set rearrangements are occurring (i.e., how much marginal difference there is between the results of recent iterations/epochs). Eventually, the output of the CLUSTER function of PS0 may include a collection of clusters, each comprising (ideally) a highly similar group of data points.

Any of at least three versions of homomorphic MinHash, each implementing a respective SCORE, UNION and DIFFERENCE function, may be employed in different embodiments. The three versions may be referred to as "naïve homomorphic MinHash", "improved homomorphic MinHash", and "bounds-based homomorphic MinHash" in various embodiments. The naïve and improved algorithms may differ only in the way in which the SCORE function is implemented, with the rest of the algorithm logic remaining unchanged between these two algorithms. Each of these first two algorithms may use (a) a minimum hash information array comprising MinHash values as well as (b) a contributor count array as auxiliary metadata. In a further improvement which helps deal with scenarios in which contributor count information may potentially be lost as a result of some of the split operations, in various embodiments the bounds-based algorithm may (as suggested by its name) use additional information in the form of upper and lower bounds for at least some MinHash values in its computations. Respective sets of pseudocode PS1, PS2 and PS3 are provided for the three algorithms and discussed below. In each of the three algorithms, in various embodiments, the minimum hash information arrays and the contributor counts for a derived set (which is generated as a result of a set operation applied to a pair of operand sets in a given iteration) may be obtained using the minimum hash information arrays and contributor count arrays of the operand sets, without actually having to apply hash functions to the contents of the operand sets. The derived set's minimum hash information array and contributor count array may then be saved or stored as part of the input of a subsequent iteration of the similarity analysis task (if such an iteration is required).

```
--------Start pseudo-code set PS1 for Algorithm 1 (naïve homomorphic MinHash)----------
    # Terminology: MinHash value for set S_j and i^th hash function array
    is denoted by: h_πi(S_j)
    function UNION(S_1, S_2)
        h_πi(S_1 ∪ S_2) = min(h_πi(S_1), h_πi(S_2))
        if (h_πi(S_1) = h_πi(S_2)) then
```

-continued $c_i^{S_1 \cup S_2} = c_i^{S_1} + c_i^{S_2}$<br>
else<br>
$c_i^{S_1 \cup S_2} = c_i^{S^*}$ where $S^* = \text{argmin}_{Sj \in \{S_1, S_2\}}(h_{\pi i}(S_j))$<br>
<br>
function DIFFERENCE($S_1$, $S_2$)<br>
if ($h_{\pi_i}(S_1)$ != $h_{\pi_i}(S_2)$) then<br>
$h_{\pi_i}(S_1 \setminus S_2) = h_{\pi_i}(S_1)$<br>
$c_i^{S_1 \setminus S_2} = c_i^{S_1}$<br>
else # this means $h_{\pi_i}(S_1)$ is equal to $h_{\pi_i}(S_2)$<br>
$h_{\pi_i}(S_1 \setminus S_2) = h_{\pi i}(S_1)$<br>
if ($c_i^{S_1} > c_i^{S_2}$) then<br>
$c_i^{S_1 \setminus S_2} = c_i^{S_1} - c_i^{S_2}$<br>
else<br>
$c_i^{S_1 \setminus S_2} = 0$<br>
<br>
function SCORE($S_1$, $S_2$)<br>
$c' = \Sigma_{i=1,n} \mathbb{1}[(h_{\pi_i}(S_1) = h_{\pi i}(S_2)) \wedge (c_i^{S_1} > 0) \wedge (c_i^{S_2} > 0)]$<br>
$n' = \Sigma_{i=1,n} \mathbb{1}[(c_i^{S_1} \mathrel{!=} 0) \wedge (c_i^{S_2} \mathrel{!=} 0)]$<br>
$\hat{J} = c'/n'$<br>
---------End pseudo-code set PS1---------------------------------------------------------------

Pseudo-code set PS1 illustrates aspects of the naïve homomorphic MinHash algorithm. Note that unlike in some other types of locality-based hashing schemes such as simhash (used for cosine similarity), the operations underlying the statistics for MinHash are non-linear due to the elementwise minimum operation that produces the underlying vector of hash values. Moreover, the set semantics on which the MinHash SCORE function relies are problematic because the UNION and DIFFERENCE functions need to maintain the invariance that a parent set is equal to the union of a collection of child sets (from which the parent set was constructed). When a difference operation is performed between a parent set S and a child set $S_{c1}$, all of the child's elements cannot simply be removed from the parent set, because a sibling child set $S_{c2}$ may have also (redundantly) contributed some of those elements to the parent set. To address this situation, an array of additional non-negative integer variables or "contributor counts" may be introduced as auxiliary metadata for each set S in various embodiments, with each element of the array indicating the number of child sets that contribute the associated hash value. As such, the contributor count entry at a given index for a set S may be described as representing the number of child sets of S whose respective MinHash arrays meet a contribution criterion with respect to S's MinHash entry at the same index in various embodiments. The n-dimensional MinHash representation $h_{\pi i}(S)$ (for i=1, . . . , n, where n is the number of hash functions being used) of each set S may thus be augmented in such embodiments with an n-dimensional vector or array of contributor counts $c_i^S$, in which each dimension corresponds to a minimum hash value. Another challenge that is addressed in various embodiments is that the difference operation may remove an element such that it may not be straightforward to re-compute the new minimum hash value (without re-running the hash functions from scratch or re-computing the set from the union of the remaining child sets); this problem of potential loss of information is dealt with in the bounds-based version of homomorphic MinHash.

With respect to the UNION function in the pseudo-code set PS1, observe that given the MinHash value of two sets, it is relatively straightforward to compute the MinHash value of the union, which is simply the minimum of the MinHash values of the two sets being merged (line 3 of PS1). To obtain the corresponding elements of the contributor count array, we either keep the count associated with the smaller hash (if the two were different) (line 7 of PS1), or sum the counts if they were the same (line 5).

With respect to the DIFFERENCE function of PS1, the computations are not as straightforward. Furthermore, the ability to add and remove subsets of a parent set may need to be supported for the kinds of similarity analysis tasks for which the MinHash algorithms are utilized in various embodiments, making this DIFFERENCE function somewhat non-standard. If, when considering the difference ($S_1 \setminus S_2$) (elements of $S_1$ that are not in $S_2$), the MinHash values at a particular index differ for the two operand sets ($h_{\pi i}(S_1) !=_{\pi i}(S_2)$), as checked in line 10, then the MinHash value of the derived difference result ($S_1 \setminus S_2$) is set to the MinHash value of $S_1$ (line 11), and the contributor count of ($S_1 \setminus S_2$) is also set to the contributor count of $S_1$. Note that in embodiments in which all larger sets being considered as parents in the difference operation are constructed iteratively using union operations applied to smaller sets, the subset being subtracted or removed must have been previously added to the parent set, so the scenario where $h_{\pi i}(S_1) >_{\pi i}(S_2)$ can be eliminated.

In the else clause starting at line 13 of PS1, the MinHash values for $S_1$ and $S_2$ are equal. $h_{\pi i}(S_1 \setminus S_2)$ is once again set equal to $h_{\pi i}(S_1)$. If ($c_i^{S_1} > c_i^{S_2}$), as checked in line 15, this means that the contribution count corresponding to the child subset being removed was smaller than that of the parent set, so the count for the child subset can be subtracted to obtain the count for the difference result (line 16). The scenario where ($c_i^{S_1} = c_i^{S_2}$), and the count for $S_1 \setminus S_2$ is set to zero (line 18) is a little problematic as it represents a potential loss of information (because some other child subsets than $S_2$ could also have contributed the same MinHash values, and we cannot tell whether this is the case, so setting the count to zero may be misleading). The problem of dealing with such zero contributor counts is addressed in different ways in the improved and bounds-based algorithms as discussed below.

In the naïve MinHash algorithm of PS1, the zero contributor count cases are simply eliminated from consideration in the SCORE function. The numerator (c') of the ratio used as the similarity score estimate $J^\wedge$ is computed as the sum of the number of cases (among the n MinHash values being considered) in which both operand sets' MinHash values are the same, and the contribution counts are both non-zero (line 21). The denominator n' simply sums up all the cases in which both operand sets' counts are non-zero (line 22). The naïve algorithm of PS1 may be leave room for improvement because this strategy of ignoring hash values that have zero contributor counts may have consequences for both bias and variance of the score $\hat{J}$. First, since fewer hashes are employed in total, the variance increases, and if left unchecked may potentially lead to a worst case in which all counts are zero, leading to the scenario that the score cannot be computed. Second, the hashes associated with zero contributor counts are correlated (due to the removal of the subsets from the parent sets), so bias may be introduced into the Jaccard score estimate. There is also the question of how best to perform union and difference set operations for cases in which the contributor count is zero; this is addressed in the bounds-based algorithm discussed below.

In the improved homomorphic MinHash algorithm whose pseudo-code set PS2 is provided below, the Jaccard score computation is modified from that of the naïve algorithm of PS1, making somewhat better use of the zero contributor count cases. Note that other than the computation of the denominator of the score (lines 23 and 24 of PS2), the naïve and improved MinHash algorithms are identical.

```
--------Start pseudo-code set PS2 for Algorithm 2 (Improved homomorphic MinHash)-----
# Terminology: MinHash value for set S_j and i^th hash function array is
denoted by: h_πi(S_j)
function UNION(S_1, S_2) # unchanged from Algorithm 1
    h_πi(S_1 ∪ S_2) = min(h_πi(S_1), h_πi(S_2))
    if (h_πi(S_1) = h_πi(S_2)) then
        c_i^(S1∪S2) = c_i^(S1) + c_i^(S2)
    else
        c_i^(S1∪S2) = c_i^(S*) where S* = argmin_(Sj∈{S1,S2})(h_πi(S_j))

function DIFFERENCE(S_1, S_2) # unchanged from Algorithm 1
    if (h_πi(S_1) != h_πi(S_2)) then
        h_πi(S_1 \ S_2) = h_πi(S_1)
        c_i^(S1\S2) = c_i^(S1)
    else # this means h_πi(S_1) is equal to h_πi(S_2)
        h_πi(S_1 \ S_2 ) = h_πi(S_1)
        if (c_i^(S1) > c_i^(S2)) then
            c_i^(S1\S2) = c_i^(S1) - c_i^(S2)
        else
            c_i^(S1\S2) = 0

function SCORE(S_1, S_2) # Changed with respect to Algorithm 1
    c' = Σ_(i=1,n) 𝟙 [(h_πi(S_1) = h_πi(S_2)) ∧ (c_i^(S1) > 0) ∧ (c_i^(S2) > 0)]
    n' = Σ_(i=1,n) 𝟙 [ (c_i^(S1) != 0) ∧ (c_i^(S2) != 0)]
    m' = Σ_(i=1,n) 𝟙 [((c_i^(S1) = 0) ∧ (h_πi(S_1) > h_πi(S_2))) ∨ ((c_i^(S2) = 0) ∧
    (h_πi(S_2) > h_πi(S_1)))]
    J' = c'/(n' + m')
---------End pseudo-code set PS2------------------------------------------------------------
```

As mentioned earlier, zero contributor count cases may present a problem for MinHash based Jaccard similarity score estimations, as in these cases the precise MinHash values may not be known. Ideally, the new MinHash values could simply be recomputed once the child set has been removed, but this may be impractical in that either (a) hash values may have to be recomputed for all the set elements, or (b) exhaustive UNION-based enumeration may be required over all the remaining subsets that collectively define the parent set. Instead, the improved MinHash algorithm shown in PS2 is based on the consideration that although there is no way (without expensive re-computations as indicated above) of knowing exactly what the minimum hash value should be in the zero contributor count cases, partial information may still be available from which disagreement among the MinHash values (and hence additional entries in the denominator of the $\hat{J}$ calculation) can be inferred. That is, although we do not have enough evidence to determine whether or not two missing hash values agree, we might have enough evidence to determine that they disagree. In particular, a hash value with a zero contributor count means that the new hash value (although we do not know what it is) must be greater than or equal to the old hash value. Therefore, if the corresponding minimum hash for the other operand set is smaller, we know that they cannot possibly agree. Accordingly, we can include such disagreement cases to correct some of the problems of the naïve algorithm's score estimation. The m' computation shown in line 23 makes use of this reasoning, and m' is added to the n' term in the denominator of the $\hat{J}$ computation in line 23, thereby providing a more accurate similarity estimate than was provided by the naïve MinHash algorithm. In embodiments in which the improved homomorphic MinHash algorithm is used, determining the denominator of the score computation may thus comprise computing both n' and m' and then summing these two values. n' may be determined as the number of elements of the contributor count array of the first operand set for which the contributor count is non-zero, and a corresponding contributor count of the contributor count array of the second operand set is also non-zero (as in line 21 of PS2). m' may be determined by taking the disagreement cases into account, where the number of elements of a count array of one operand set is zero and the corresponding MinHash array element exceeds that of the second operand set, In the bounds-based homomorphic MinHash algorithm, for which pseudo-code set PS3 is provided below, the approach taken in the improved algorithm of PS2 with respect to leveraging available information for the zero contribution count cases is further extended, by storing and adjusting bounds of missing hash values as union and difference operations are performed. As a result, even more cases when there is not enough exact hash information available may be handled in embodiments in which the bounds-based algorithm shown in PS3 is employed than were handled using the improved algorithm of PS2.

-----Start pseudo-code set PS3 for Algorithm 3 (Bounds-based homomorphic MinHash----

1: # Terminology: Bounds for $i^{th}$ index of MinHash array for set $S_1$ are denoted by:

2: # $b_{\pi i}(S_1) = [m_{i1}, m'_{i1}]$

3: # and similarly, bounds for $i^{th}$ index of MinHash array for set $S_2$ are denoted by:

4: # $b_{\pi i}(S_2) = [m_{i2}, m'_{i2}]$

5: # Assumption: range of possible hash values is: [MIN, MAX]

6: #

7: function UNION($S_1$, $S_2$)

8: $b_{\pi i}(S_1 \cup S_2) = [\min(m_{i1}, m_{i2}), \min(m'_{i1}, m'_{i2})]$

9: if $(m_{i1} = m_{i2} = m'_{i1} = m'_{i2})$ then

10: $c_i^{S_1 \cup S_2} = c_i^{S_1} + c_i^{S_2}$

11: else

12: $c_i^{S_1 \cup S_2} = c_i^{S^*}$ where $S^* = \operatorname{argmin}_{S_j \in \{S_1, S_2\}}(h_{\pi i}(S_j))$

13:

14: function DIFFERENCE ($S_1$,$S_2$)

15: if $(m_{i1} \mathrel{!=} m_{i2})$ then

16: $b_{\pi i}(S_1 \setminus S_2) = [m_{i1}, m'_{i1}]$

17: $c_i^{S_1 \setminus S_2} = c_i^{S_1}$

18: else if $(m_{i1} = m_{i2} = m'_{i1} = m'_{i2})$ then

19: if $(c_i^{S_1} > c_i^{S_2})$ then

20: $b_{\pi i}(S_1 \setminus S_2) = b_{\pi i}(S_1)$

21: $c_i^{S_1 \setminus S_2} = c_i^{S_1} - c_i^{S_2}$

22: else

23: $b_{\pi i}(S_1 \setminus S_2) = [m_{i1} + 1, MAX]$

24: $c_i^{S_1 \setminus S_2} = 0$

25:

26: function SCORE(($S_1$,$S_2$)

27: $J\hat{} = (1/n)\Sigma_{i=1,n} \Sigma_{k1=mi1,m'i1} \Sigma_{k2=mi2,mi'2} (Pr(k_1 = k_2)Pr(k_1 \in b_{\pi i}(S_1))\, Pr(k_2 \in b_{\pi i}(S_2))$ 28: $= (1/n)\, \Sigma_{i=1,n} |o_i(S_1,S_2)| / ((m'_{i1} - m_{i1}+1)(m'_{i2} - m_{i2}+1))$ 29: where $o_i(S_1,S_2) = set(b_{\pi i}(S_1)) \cap set(b_{\pi i}(S_2))$ ---------End pseudo-code set 3------------------------------------------------------------

In practice, the MinHash values generated for a collection of sets span a known finite range, denoted in PS3 by [MIN, MAX]. As a consequence, a similarity score estimation based on bounds may be made more precise using the following approach. Let the MinHash value $h_{\pi i}(S)$ for a set S be bounded by integers $m_i$ and $m'_i$, i.e., $m_i <= h_{\pi i}(S) <= m'_i$. We denote these bounds as the closed interval $b_{\pi i}(S) = [m_i, m'_i]$. Note that in the beginning of the iterations, when the MinHash values are known precisely, $m_i = m'_i$.

In the UNION function of PS3 (lines 7-12 of PS3), when two sets are merged, the MinHash bounds of the merged set range from the minimum of the lower bounds of the operand sets to the minimum of the upper bounds of the operand sets (line 8). The contributor count computations in PS3 for UNION are analogous to those of PS1 and PS2—if the MinHash values are known and equal (i.e., both lower bounds are equal to both upper bounds), the counts of the operand sets can be summed, otherwise the contribution counts for the smaller of the two MinHash values is used.

Following the analysis for set difference in the other homomorphic MinHash algorithms discussed above, the MinHash bounds in PS3 do not change except in the case where the MinHash values are identical and the corresponding counts are equal (line 23 of PS3). In this case, set difference created open-ended bounds for the MinHash value, e.g., set difference of the intervals with identical MinHash value 6 would result in the interval [7, MAX]. Thus, in PS3, set differences create open-ended intervals in the case of absolute removals of elements, but future set unions result in tighter bounds and therefore in decreased uncertainty. In effect, in various embodiments, new wider bounds may be stored at a given index of a bounds array (as in line 23 of PS3) for a difference-derived set based at least in part on determining that an entry at the same index in the contributor count array of the different-derived set is zero.

In PS3, the estimate $J^\wedge$ of the Jaccard similarity is computed as follows (in the SCORE function of lines 26-29). Originally, the estimate was defined as $$J^\wedge = (1/n)\sum_{i=1,n} \mathbb{1}\,[(h_{\pi i}(S_1) = h_{\pi i}(S_2))]$$

In the approach taken in the bounds-based MinHash algorithm represented in PS3, we know the bounds for each MinHash value $b_{\pi i}(S_1) = [m_{i1}, m'_{i1}]$ and $b_{\pi i}(S_2) = [m_{i2}, m'_{i2}]$. So the estimation can be rewritten as the sum over the probabilities that the MinHash values are identical, i.e.:

$$J^\wedge = (1/n)\sum_{i=1,n} Pr[h_{\pi i}(S_1) = h_{\pi i}(S_2)] = (1/n))\sum_{i=1n}\sum_{k1=mil,m'i1}\sum_{k2=mi2,m'i2}(Pr(k_1 = k_2)Pr(k_1 \in b_{\pi i}(S_1))Pr(k_2 \in b_{\pi i}(S_2))$$

Assuming that the MinHash values are uniformly distributed over the intervals, $$Pr(h_{\pi i}(S) \in b_{\pi i}(S)) = 1/(m'_i - m_i + 1)(\text{if } m_i <= i <= m'_i), \text{ and}$$
$$= 0 \text{ otherwise.}$$

Let $o_i(S_1,S_2) = set(b_{\pi i}(S_1)) \cap set(b_{\pi i}(S_2))$ denote the overlapping region of the two intervals. The estimate $J^\wedge$ can then be computed as shown in line 28 of PS3. Note that in the case of exactly known MinHash values, the set operations and the score estimation is the same as in the previous approaches. The advantages of the bounds-based approach are achieved when MinHash values are uncertain, as the bounds-based approach utilizes more of the available information about the MinHash values.

Figure 2:
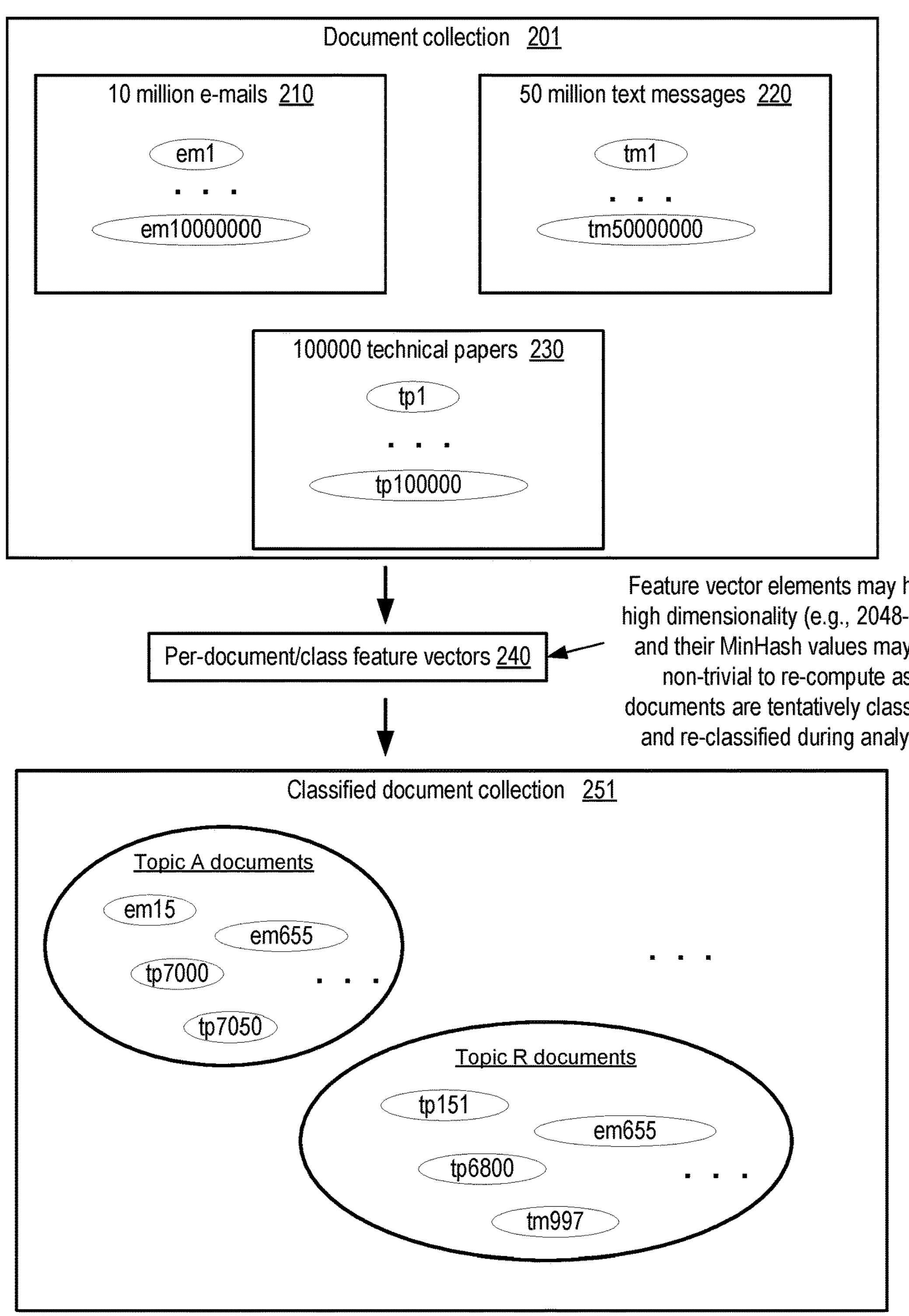
FIG. 2 illustrates an example clustering application for which enhanced MinHash algorithms may be employed, according to at least some embodiments.

FIG. 2 illustrates an example clustering application for which enhanced MinHash algorithms may be employed, according to at least some embodiments. The objective of the clustering application depicted is to categorize elements of a document collection 201 into groups or clusters based on similarity of subject matter. The document collection may comprise, for example, 10 million emails 210 (em1 through em10000000), 50 million text messages 220 (tm1 through tm50000000) and 100000 technical papers (tp1 through tp100000).

Iterative analysis of the input document set may be performed in the depicted embodiment as follows. Per-document and/or per-class feature vectors 240 of high dimensionality (e.g., with individual words being represented using a 2048-bit feature vector space) may be constructed, and compressed representations of the documents may be created using approaches similar to the enhanced MinHash algorithms. As the analysis proceeds, documents may be re-assigned from one cluster to another (e.g., to increase intra-cluster similarity and decrease cross-cluster similarity), and re-generating the MinHash values from scratch for each re-constituted cluster may be extremely inefficient. The highly efficient homomorphic MinHash algorithms discussed above may be used to avoid the costs of such re-generation of hash values in various embodiments. At the end of the iterative analysis, after the selected convergence criteria have been met, a classified document collection 251 may be generated as output in the depicted embodiment, with documents classified based on the topics covered therein. Topic A documents may include, for example, em15, em655, tp7000 and tp7050, while topic R documents may include tp151, cn655, tp6800 and tm997.

Figure 3:
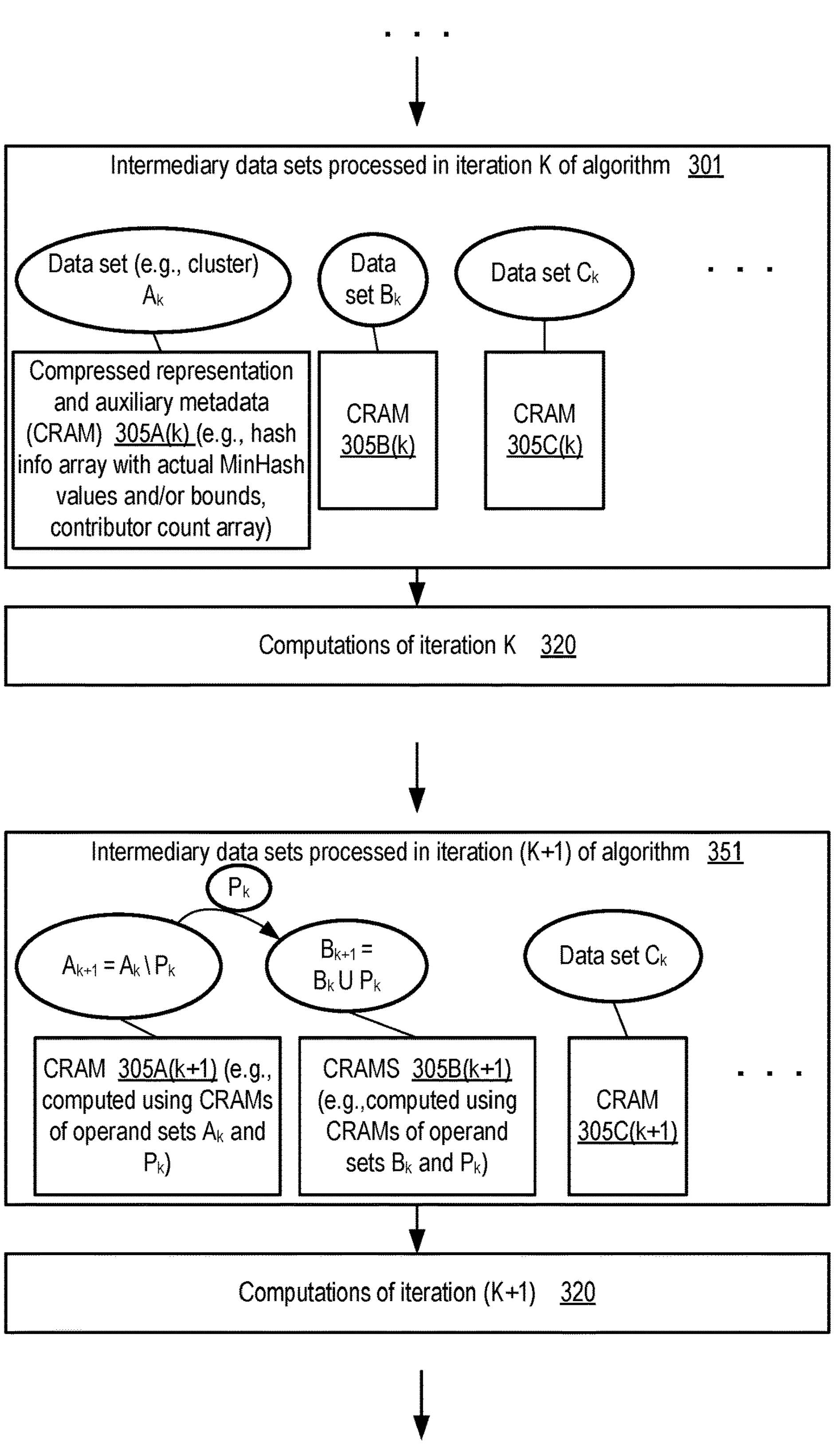
FIG. 3 illustrates aspects of an iterative similarity analysis task performed using enhanced MinHash, in which derived sets may be conditionally generated from operand sets, according to at least some embodiments.

FIG. 3 illustrates aspects of an iterative similarity analysis task performed using enhanced MinHash, in which derived sets may be conditionally generated from operand sets, according to at least some embodiments. In iteration K of the task, as indicated in block 301 of FIG. 3, the input data 301 analyzed includes data sets $A_k$, $B_k$ and $C_k$. Corresponding to each of the sets, a compressed representation and auxiliary metadata (CRAM) 305 may be stored in the depicted embodiment, such as CRAM 305A(k) for set $A_k$, CRAM 305B(k) for set $B_k$, and CRAM set 305C(k) for set $C_k$. A CRAM 305 may, for example, include a hash information array as well as a contributor count array for a given set. The hash information array (which may also be referred to as a minimum hash information array in various embodiments) for a set such as $A_k$, $B_k$ or $C_k$ may comprise the actual MinHash values for some number of hash functions (if the MinHash values are known). Alternatively, in some embodiments, the hash information array may comprise upper and/or lower bounds on the MinHash values. The contributor count array for a given set S may be related to the hash information array of the set as follows: (a) if n hash functions are being used for the compact representations, both the hash information array and the contributor count array may have n entries or elements each and (b) the contributor count at a particular index in the array may indicate (either approximately or exactly) the number of subsets of the set S (i.e., the number of subsets whose merges resulted in the set) whose MinHash value at the particular index was equal to (and hence met a contribution criterion with respect to) the MinHash value of the set S.

Depending on the nature of the task being performed, computations 320 may be performed during iteration K on sets 301 using their CRAMs 305, in which a collection of data to be used as input during the next iteration (K+1) may be generated. For example, the intermediary data sets 351 processed as input in iteration (K+1) may include a set $A_k$+1 which is derived as a result of a set difference operation $A_k \backslash P_k$. The elements of $A_k$ that are removed in the difference operation may be added to $B_k$, that is, set $B_k$+1 may be generated by merging $P_k$ with $B_k$, and so on. The decisions to merge or split the clusters or sets may be made based on MinHash based similarity scores generated using the SCORE functions shown in the pseudo-code examples PS1, PS2 or PS3, with the details depending on the algorithm being used in the depicted embodiment. At least some of the similarity scores may be obtained without actually having to apply hash functions to the operand sets. The CRAM arrays may be populated using the logic shown in the UNION and DIFFERENCE functions of the pseudocode. Further iterative re-arrangements of the clusters may be performed until a convergence or termination criterion is met, at which point the results or output of the final iteration may be provided or transmitted in the depicted embodiment.

Figure 4:
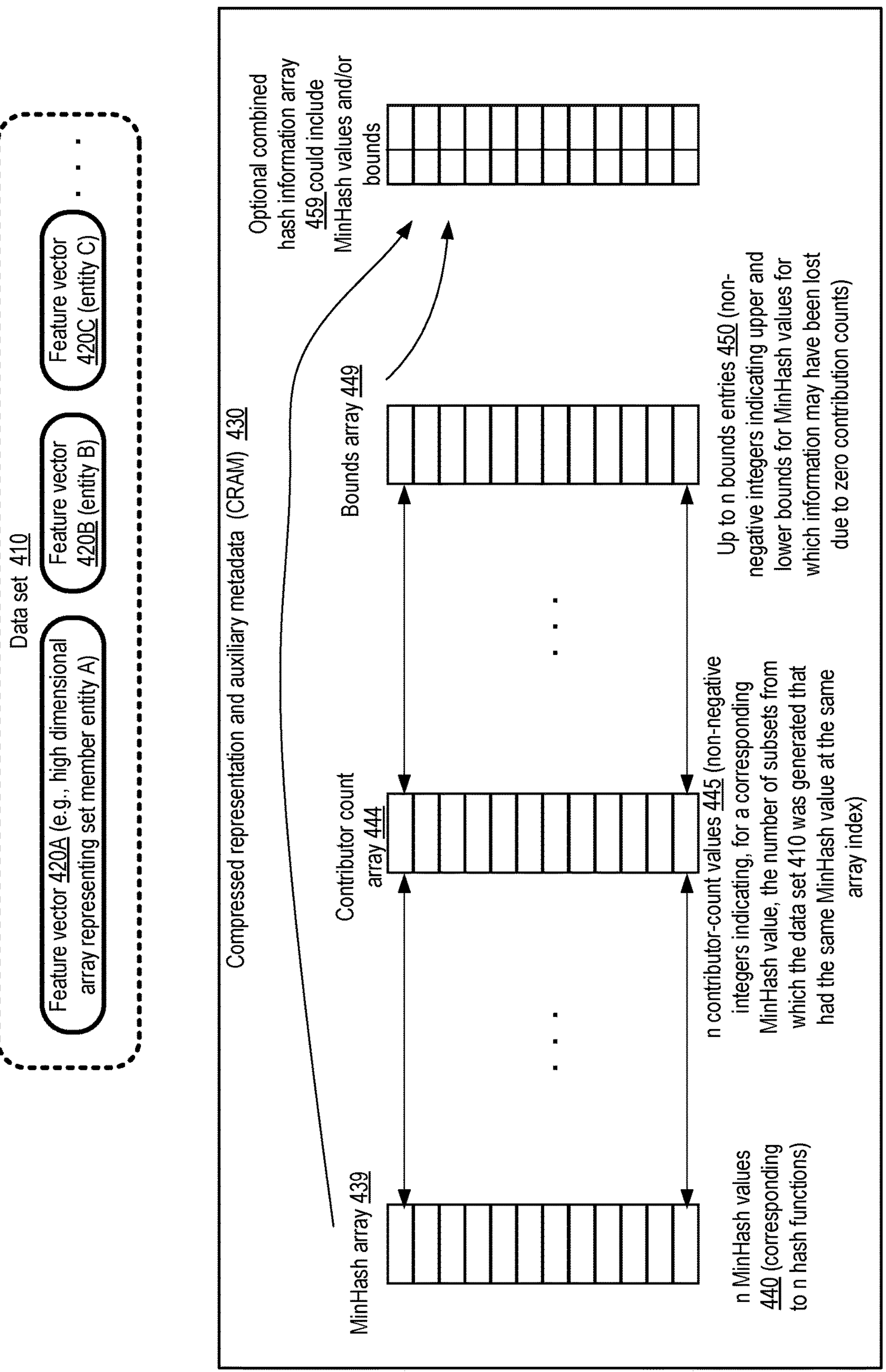
FIG. 4 illustrates example compressed representations and auxiliary metadata which may be used in various versions of enhanced MinHash algorithms, according to at least some embodiments.

FIG. 4 illustrates example compressed representations and auxiliary metadata which may be used in various versions of enhanced MinHash algorithms, according to at least some embodiments. A data set 410 may comprise a plurality of entities represented by respective feature vectors 420, such as feature vector 420A representing a set member entity A, feature vector 420B representing a set member entity B, and a feature vector 420 representing a set member entity 420C. The feature vectors may in at least some embodiments be sparse and high dimensional (e.g., each vector may contain thousands of entries). In some cases, the feature vectors may be multi-dimensional—e.g., an entry at a given index of a feature vector may itself comprise one or more other vectors. Obtaining or computing MinHash values from scratch, i.e., by directly applying a collection of hash functions to the feature vectors and computing the minimum values obtained may be computationally intensive.

In various embodiments, as indicated above, compressed representations comprising hash information arrays and auxiliary metadata may be used for the computations performed during an iterative similarity analysis task, so that direct re-computations of hash values can be avoided for reconstituted data sets whose memberships have changed due to merges or splits. In various embodiments, some combination of three types of information may be included in the compressed representation and auxiliary metadata (CRAM) 430 for a given data set 410: a MinHash values array 439, a contributor count array 444, and a bounds array 449. Individual ones of the n MinHash values 440 of the MinHash array 439 maintained/generated for a data set 410 may correspond to a respective hash function. The contributor count array 444 for a data set 410 may also comprise n values, each a non-negative integer indicating, for a corresponding MinHash value, the number of subsets or child sets from which the data set 410 was generated which had the same MinHash value at the same array index.

Consider an example scenario in which a data set $S_{parent}$ was created as a result of merges or union operations applied to three child sets $S_{child1}$, $S_{child2}$ and $S_{child3}$ over some number of iterations of a similarity analysis task. Assume further that at array index 3 (corresponding to hash function 4 of n, with zero-based indexing being used), the MinHash values in the MinHash arrays of $S_{parent}$, $S_{child1}$, $S_{child2}$ and $S_{child3}$ are 443, 342, 443 and 443 respectively. Also, assume that at array index 5 (corresponding to hash function 6 of n), the MinHash values in the MinHash arrays of $S_{parent}$, $S_{child1}$, $S_{child2}$ and $S_{child3}$ are 786, 786, 20 and 6 respectively. Then, in the contributor count array for $S_{parent}$, the count stored at index 3 would be 2 (because two of the child sets ($S_{child2}$ and $S_{child3}$) had the same MinHash value 443 as $S_{parent}$ at index 3. Further, in the contributor count array for $S_{parent}$, the count stored at index 5 would be 1 (because one of the child set ($S_{child1}$) had the same MinHash value 786 as $S_{parent}$ at index 5.

In some embodiments in which the bounds-based MinHash scheme introduced earlier is used, the bounds array 449 may comprise up to n entries 450, each comprising a pair of non-negative integers indicating upper and lower bounds for MinHash values for which information may have been lost due to zero contribution counts as discussed earlier. A zero contribution count may arise due to a split of a parent cell, in which elements of a child set are removed from the parent cell, the child set contributed to the MinHash value of the parent cell, and it is unclear whether there was any other child cell whose elements remain in the parent cell, which also contributed to the same MinHash value. As mentioned earlier, as data sets undergo merges and splits over various iterations of the similarity analysis, their bounds may get tighter as a result of merges, and looser as a result of splits resulting in zero contributor counts. The tighter the bounds, generally speaking, the higher the accuracy of the similarity scores becomes.

Note that, from a mathematical perspective, an exact MinHash value can also be considered as comprising an upper bound and a lower bound, with both bounds being identical. In some embodiments, only bounds may be stored in the CRAM for a data set—that is, available exact MinHash values may simply be represented by a lower bound that is the same as the upper bound. In other embodiments, exact MinHash values may be retained for those indexes for which contributor counts are not zero, and bounds may only be stored for the indexes in which contributor counts are zero. Thus, a combined hash information array 459, employed in some embodiments, could optionally include a combination of exact MinHash values and/or bounds. The terms "hash information array" or "minimum hash information array" may be used to refer to a combination of exact MinHash values and bounds for MinHash values in such embodiments. In some embodiments, the contributor count values may also be considered part of a hash information array maintained for a data set 410.

Figure 5:
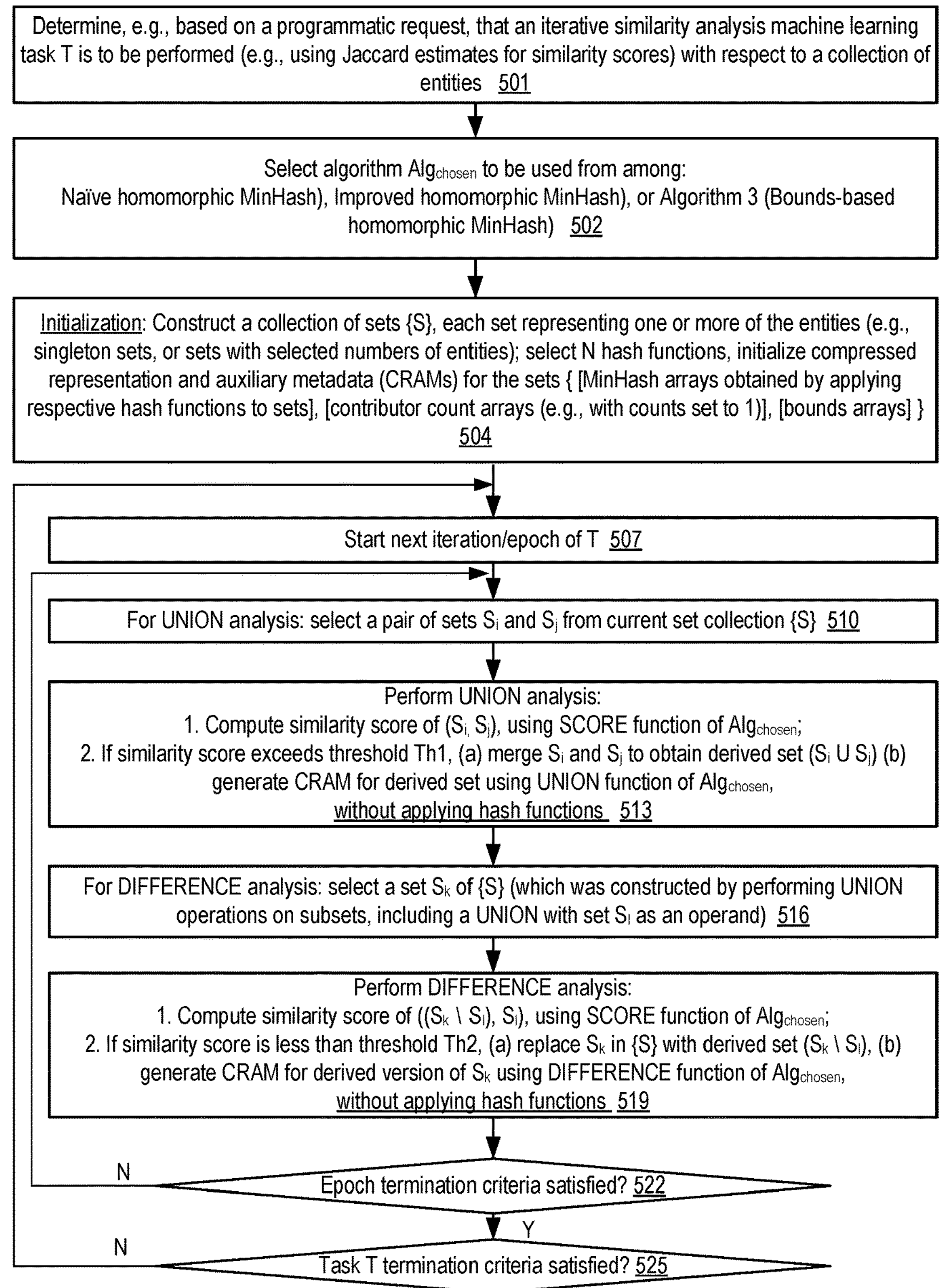
FIG. 5 is a flow diagram illustrating aspects of operations which may be performed to implement enhanced MinHash algorithms, according to at least some embodiments.

FIG. 5 is a flow diagram illustrating aspects of operations which may be performed to implement enhanced MinHash algorithms, according to at least some embodiments. As shown in element 501, a determination may be made, e.g., at a data analysis service similar in functionality to service 110 of FIG. 1, that an iterative similarity analysis task T is to be performed, in which Jaccard coefficients or estimates thereof are to be used for similarity scores pertaining to a collection of entities. In at least some embodiments such a determination may be made in response to a programmatic request.

As shown in element 502 of FIG. 5, an algorithm ($Alg_{chosen}$) may be identified for the task T, e.g., from among the three enhanced versions of MinHash introduced above: the naïve homomorphic MinHash algorithm (corresponding to pseudo-code PS1), the enhanced homomorphic MinHash algorithm (corresponding to pseudo-code PS2) and the bounds-based homomorphic MinHash algorithm (corresponding to pseudo-code PS3). In the initialization phase of the algorithm, summarized in element 504, an initial collection of sets {S} may be constructed, each representing one or more of the entities for which similarity analysis is to be performed in the depicted embodiment. In some embodiments, singleton or single-element sets may be initialized, while in other embodiments, selected numbers of entities may be placed in individual sets (e.g., a random assignment of entities to clusters may be made). A number (N) of hash functions to be used for the analysis may be selected, and the compressed representations and auxiliary metadata (CRAMs) for the various sets may be initialized. The CRAMs may, for example, comprise MinHash arrays generated by applying the hash functions to the sets, contributor count arrays (all of whose entries may be initialized to 1 in at least some embodiments), and/or the bounds arrays for storing upper and lower bounds for the MinHash values. Meta-parameters which govern various aspects of the algorithm, including for example the number N of entries in the various arrays, the types of hash functions to be used, the MIN and MAX values of the range of MinHash values, and so on, may be specified via programmatic interfaces in some embodiments. In at least one embodiment, a client of a data analysis service or tool being employed for task T may specify the particular enhanced MinHash algorithm to be used. In some embodiments, a client may provide other types of detailed guidance regarding the task via the programmatic interfaces, such as (a) a threshold criterion to be used to determine whether a set operation of a particular type is to be performed with respect to a pair of operand sets in a given iteration (corresponding to threshold1 or threshold2 of pseudo-code set PS0), (b) a termination criterion for an iteration, (c) a destination to which the result of the similarity analysis task is to be provided, and/or (d) an indication of one or more data sources from which information pertaining to the plurality of entities is to be obtained.

One or more iterations or epochs of the task T may then be performed in the depicted embodiment, starting in operations corresponding to element 507 of FIG. 5. In the depicted embodiment, two kinds of analysis may be performed to (potentially) change the member elements of the sets {S}: a UNION or merge analysis, and a DIFFERENCE or split analysis.

As part the UNION analysis, a pair of sets $S_i$ and $S_j$ may be identified from {S} as candidates for merging (element 510) in the depicted embodiment. Any of a number of techniques may be used to select candidate pairs of operand sets in different embodiments—e.g., random selection may be used, or a heuristic associated with the specific type of task T may be used (e.g., sets with smaller cardinalities may be preferentially selected for UNION analysis during early iterations). Computations of the UNION analysis and corresponding condition set replacements may then be performed (element 513): e.g., using the SCORE function of $Alg_{chosen}$, a minimum hash based similarity score for the union of the operand sets $S_i$ and $S_j$ may be obtained using the CRAMs of the operand sets, without actually applying any hash functions to the operand sets. If the score exceeds a threshold Th1, the two operand sets may be merged, in effect replacing $S_i$ and $S_j$ with the derived set ($S_1 \cup S_2$). The CRAM for the derived set may be generated, e.g., using the UNION function of $Alg_{chosen}$, also without having to apply hash functions to the elements of the merged set. The CRAM value for the derived merged set may be stored and used as input in further analysis during subsequent iterations (if subsequent iterations are needed for task T).

For the DIFFERENCE analysis, in at least some iterations a particular set $S_k$ of the set collection {S}, which was constructed by performing UNION operations of its subsets (including a subset $S_1$) in earlier iterations, may be identified (element 516). In effect, just as a pair of sets $S_i$ and $S_j$ were identified for the UNION analysis, a pair of sets $S_k$ and $S_1$ may be identified for the DIFFERENCE analysis. The operands for the DIFFERENCE analysis may also be chosen using any of a variety of techniques in different embodiments, such as random selection, heuristics-based selection, and so on. The DIFFERENCE analysis computations and conditional set replacement may then be performed (element 519). A similarity score with respect to ($S_k \backslash S_1$) and ($S_1$) may be obtained, using the SCORE function of the chosen algorithm, without actually having to re-compute minimum hash values. If the score is less than a threshold Th2, the larger operand may be replaced in {S} by the set derived via the difference operation, and the CRAM for the derived set may be generated using the DIFFERENCE function of $Alg_{chosen}$, again without having to re-compute any hash values. The CRAM value for the derived difference-based set may be stored and used as input in further analysis during subsequent iterations (if subsequent iterations are needed for task T).

In the embodiment depicted in FIG. 5, the UNION analysis is shown being performed before the DIFFERENCE analysis. In other embodiments, the DIFFERENCE analysis may be performed before the UNION analysis, or the two types of analysis may be performed in parallel. If an epoch/iteration termination criterion is not satisfied (as checked in operations corresponding to element 522), additional UNION and or DIFFERENCE analysis operations on one or more pairs of operand sets may be performed in some embodiments (e.g., starting with operations corresponding to element 510). Any of a variety of epoch termination criteria may be used in different embodiments—e.g., if a selected number of UNION and/or DIFFERENCE analyses have been performed, the epoch may be termed complete, or if a certain amount of resources or time has been consumed, the epoch may be terminated.

If the epoch is terminated, in some embodiments one or more criteria for the termination of the overall task T may be checked (element 525), and additional epochs/iterations may be initiated if the criteria are not met (e.g., operations corresponding to element 507 onwards may be repeated). Any of a variety of task termination criteria may be employed in different embodiments: for example, if the number of set membership changes made over the last V iterations/epochs lies below a threshold, further epochs/iterations may not be scheduled, or if the total amount of resources or time consumed for task T exceeds a threshold, the task may be further epochs/iterations may not be scheduled.

After the decision to not schedule any further iterations/epochs is made, in at least some embodiments results or output of the task T (e.g., membership information of similarity-based clusters or classes identified among the entities being examined) may be transmitted, stored or provided to one or more destinations in the depicted embodiment (element 528). In at least some embodiments, the results or output may in turn trigger automated response actions, e.g., merging of databases after de-duplication of entries, generating reports identifying co-references, and so on.

It is noted that in various embodiments, at least some operations other than those illustrated in the flow diagram of FIG. 5 may be performed to implement the similarity analysis techniques described above. Some of the operations shown may not be implemented in some embodiments, may be implemented in a different order, or in parallel rather than sequentially.

To better understand the quality of the similarity estimates, the homomorphic MinHash algorithms introduced above were compared to exact Jaccard estimates. In particular, a Markov Chain Monte Carlo (MCMC) algorithm was run, which adds and remove subsets from sets. Each element of the sets had an associated binary feature vector that contributes to the representation of the set, which the model employs to compute probability estimates for MCMC. Measurements indicated that even with the naïve MinHash algorithm, the sampling rate improved from approximately 2000 samples a second (without the homomorphic MinHash algorithm) to almost 30000 samples a second (with the homomorphic MinHash algorithm), indicating a sharp increase in performance.

Figure 6:
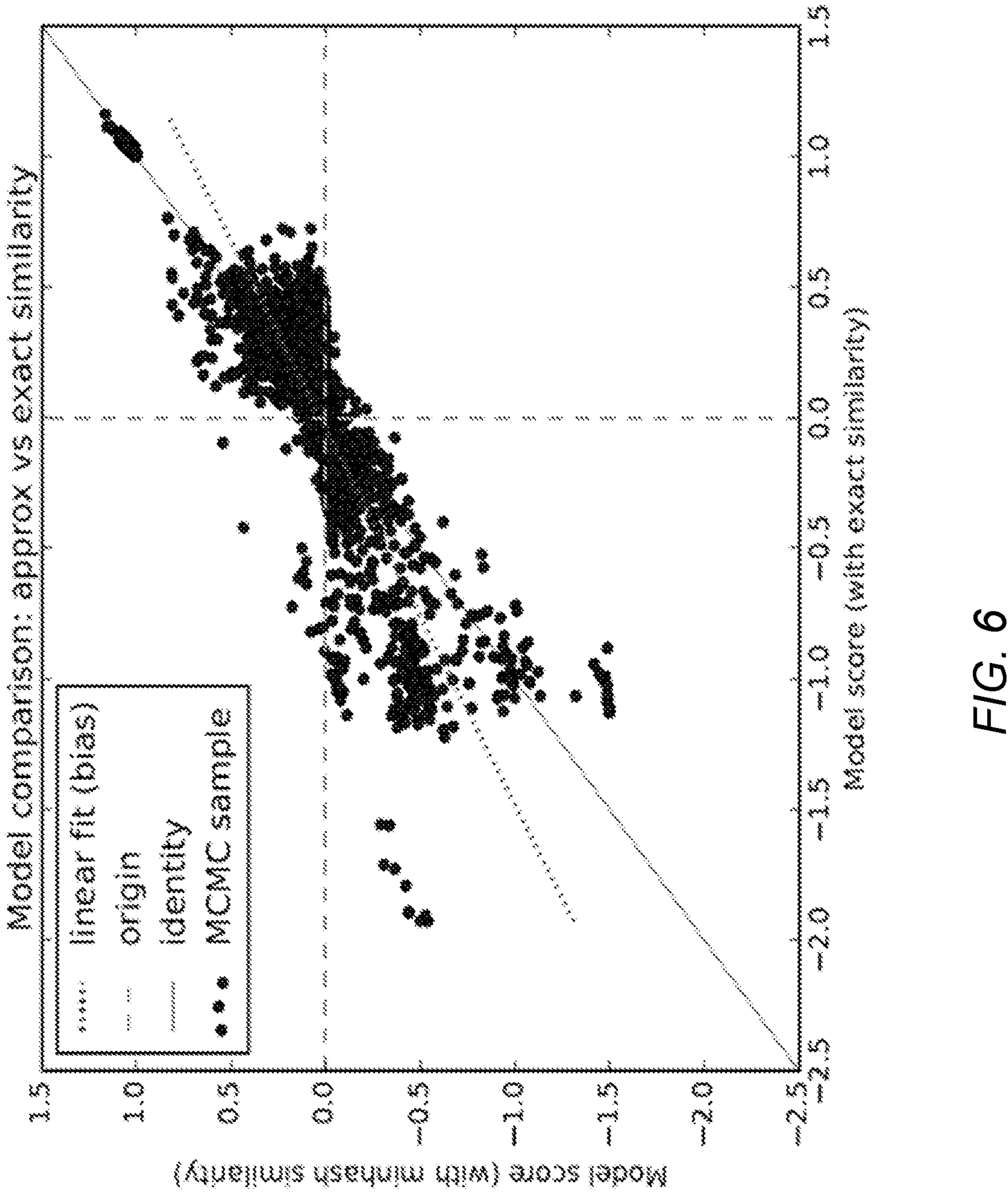
FIG. 6 illustrates example results of executing an enhanced MinHash algorithm, according to at least some embodiments.

In addition, the quality of the Jaccard estimate obtained using the homomorphic MinHash algorithms was compared relative to exact Jaccard similarity. FIG. 6 illustrates example results of executing an enhanced MinHash algorithm, according to at least some embodiments. Each point in the plot represents an MCMC sample (a sample, or possible world, is an assignment of elements to sets). The x-axis of the graph shown in FIG. 6 represents the difference in the exact Jaccard similarity estimates between the current set assignment and the previous set assignment, and the y-axis represents the difference under the naïve homomorphic representations of the samples. The identity line y=x corresponds to a scenario in which the homomorphic MinHash estimates are perfect, so the closer the points are to the origin line, the better the quality of the MinHash results. As shown in FIG. 6, the results obtained efficiently using the naïve homomorphic algorithm are quite close to the more slowly-obtained best possible results. A linear model was fitted to the points (indicated by the "linear fit-bias" line). The discrepancy between the linear fitted line and the identity line is an indication of a small bias introduced by the naïve MinHash approach. As discussed earlier, this bias may be reduced by using the improved or bounds-based algorithms in various embodiments.

Figure 7:
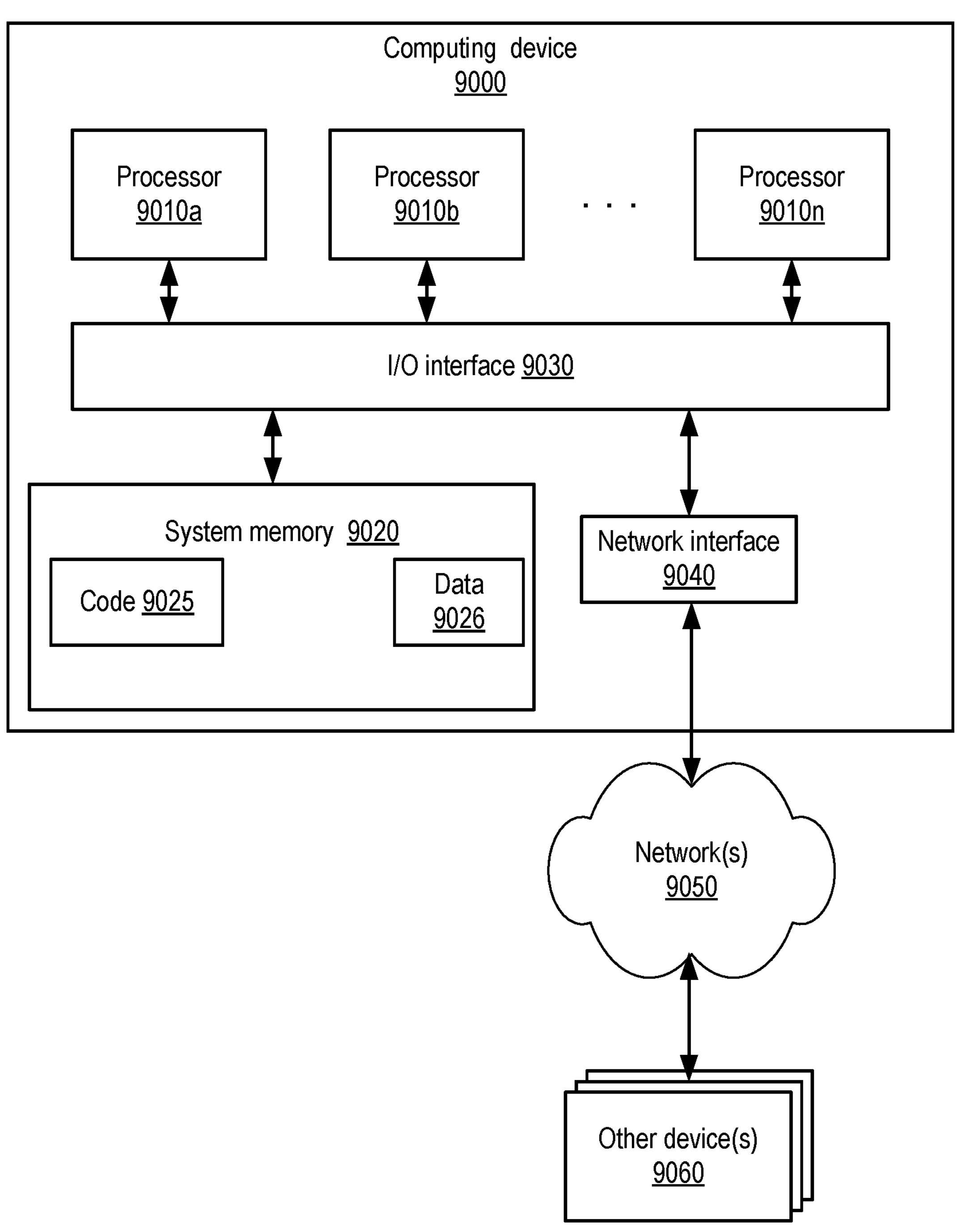
FIG. 7 is a block diagram illustrating an example computing device that may be used in at least some embodiments.

In at least some embodiments, a server that implements a portion or all of one or more of the technologies described herein, including the naïve, improved and bounds-based MinHash algorithms described, as well as the components of a data analysis service similar to that shown in FIG. 1 may include a general-purpose computer system that includes or is configured to access one or more computer-accessible media. FIG. 7 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors. NUMA architectures may be used in some embodiments.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 (which may for example comprise the code for various implementations of the enhanced MinHash algorithms discussed earlier) and data 9026 (which may for example include the data sets on which similarity analysis is performed using the enhanced MinHash algorithms).

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 6, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 6 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, one or more computer-accessible storage media may comprise instructions that when executed on or across one or more processors implement the techniques described. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Figure 8:
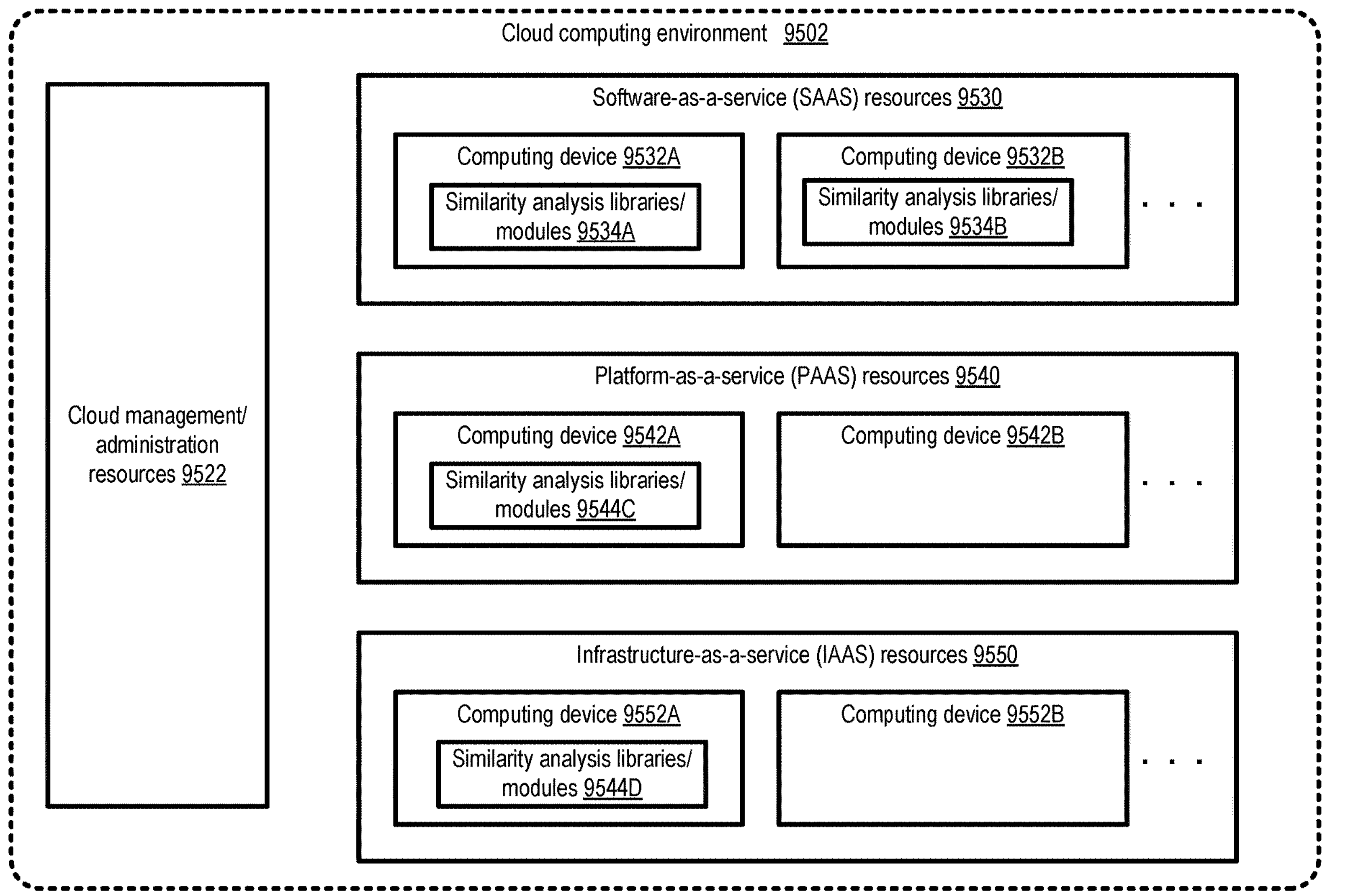
FIG. 8 illustrates an example cloud computing environment in which enhanced MinHash techniques may be employed, according to at least some embodiments.

FIG. 8 illustrates an example cloud computing environment in which enhanced MinHash techniques may be employed, according to at least some embodiments. As shown, cloud computing environment 9502 may include cloud management/administration resources 9522, software-as-a-service (SAAS) resources 9530, platform-as-a-service (PAAS) resources 9540 and/or infrastructure-as-a-service (IAAS) resources 9550.

Individual ones of the these subcomponents of the cloud computing environment 9502 may include a plurality of computing devices (e.g., devices similar to device 9000 shown in FIG. 7) distributed among one or more data centers in the depicted embodiment, such as devices 9532A, 9532B, 9542A, 9542B, 9552A, and 9552B. A number of different types of network-accessible services, such as a data analysis service similar in functionality to service 110 of FIG. 1, database services, customer-relationship management services, and the like may be implemented using the resources of the cloud computing environment in various embodiments.

In the depicted embodiment, clients or customers of the cloud computing environment 9502 may choose the mode in which they wish to utilize one or more of the network-accessible services offered. For example, in the IAAS mode, in some embodiments the cloud computing environment may manage virtualization, servers, storage and networking on behalf of the clients, but the clients may have to manage operating systems, middleware, data, runtimes, and applications. If, for example, a client wishes to use IAAS resources 9550 for some desired application for which similarity analysis techniques of the kind described earlier are used, the clients may identify one or more virtual machines implemented using computing devices 9552 (e.g., 9552A or 95352B) as the platforms on which the applications are being run, and ensure that the appropriate similarity analysis libraries/modules 9544D which implement the enhanced MinHash algorithms are installed/available on those virtual machines. In the PAAS mode, clients may be responsible for managing a smaller subset of the software/hardware stack in various embodiments: e.g., while the clients may still be responsible for application and data management, the cloud environment may manage virtualization, servers, storage, network, operating systems as well as middleware. Similarity analysis libraries/modules such as 9544C may be pre-deployed to, and run at, at least some PAAS resources (e.g., 9542A, 9542B etc.) for applications on various clients in different embodiments. In the SAAS mode, the cloud computing environment may offer applications as a pre-packaged service (including the underlying similarity analysis libraries/modules such as 9534A or 9534B), managing even more of the software/hardware stack in various embodiments—e.g., clients may not even have to explicitly manage applications or data.

The administration resources 9522 may perform resource management-related operations (such as provisioning, network connectivity, ensuring fault tolerance and high availability, and the like) for all the different modes of cloud computing that may be supported in some embodiments. Clients may interact with various portions of the cloud computing environment using a variety of programmatic interfaces in different embodiments, such as a set of APIs (application programming interfaces), web-based consoles, command-line tools, graphical user interfaces and the like. Note that other modes of providing services at which the enhanced MinHash algorithms described earlier are implemented may be supported in at least some embodiments, such as hybrid public-private clouds and the like.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A computer-implemented method, comprising:

obtaining a plurality of sets individually representing one or more data entities, wherein individual sets of the plurality of sets respectively comprise:

a contributor count array comprising respective counts of child sets; and a minimum hash information array generated without applying a hash function;

generating a derived set from the plurality of obtained sets, wherein the generating comprises:

identifying, from the plurality of sets, a first set and a second set according to respective similarity scores for the first and second sets, the respective similarity scores determined according to the respective minimum hash information arrays and the respective contributor count arrays of the first and second sets without applying a hash function to the first and second sets;

applying a set operation to the identified first and second sets to determine the derived set;

generating a minimum hash information array for the derived set without applying a hash function, the generating performed according to the respective minimum hash information arrays of the first and second sets and the respective contributor count arrays of the first and second sets; and generating a contributor count array for the derived set, wherein an entry at a particular index in the generated contributor count array is indicative of a count of child sets of the derived set whose minimum hash information array meets a criterion with respect to an entry at the particular index in the minimum hash information array for the derived set.

2. The computer-implemented method of claim 1, wherein the set operation is one of a union operation or a set difference operation.

3. The computer-implemented method of claim 1, wherein the similarity score for the first and second sets is a Jaccard similarity score.

4. The computer-implemented method of claim 1, wherein the generating further comprises:

determining a first number of elements of the contributor count array of the first set for which the contributor count is non-zero and a corresponding contributor count of the contributor count array of the second set is also non-zero;

determining a second number of elements of the contributor count array of the first set for which the contributor count is zero and a corresponding minimum hash value of the hash information array of the first set exceeds the corresponding minimum hash value of the hash information array of the second set; and dividing a positive integer by a sum of at least the first number and the second number to determine the similarity score.

5. The computer-implemented method of claim 1, wherein a particular entry of the minimum hash information array of the derived set indicates a bound for a minimum hash value associated with a hash function and the derived set.

6. The computer-implemented method of claim 5, wherein the particular entry of the minimum hash information array of the derived set is stored at a first index within the minimum hash information array of the derived set, and wherein the method further comprises determining that the bound is to be stored at the first index based at least in part on determining that an entry at the first index in the contributor count array of the derived set indicates a zero contributor count.

7. The computer-implemented method of claim 1, wherein generating the derived set is performed for individual ones of a plurality of iterations of a similarity analysis task.

8. A system, comprising:

one or more processors and a memory storing instructions that upon execution on or across the one or more processors implement a similarity analysis task configured to:

obtain a plurality of sets individually representing one or more data entities, wherein individual sets of the plurality of sets respectively comprise:

a contributor count array comprising respective counts of child sets; and a minimum hash information array generated without applying a hash function;

generate a derived set from the plurality of obtained sets, wherein to generate the derived set the similarity analysis task is configured to:

identify, from the plurality of sets, a first set and a second set according to respective similarity scores for the first and second sets, the respective similarity scores determined according to the respective minimum hash information arrays and the respective contributor count arrays of the first and second sets without applying a hash function to the first and second sets;

apply a set operation to the identified first and second sets to determine the derived set;

generate a minimum hash information array for the derived set without applying a hash function, the generating performed according to the respective minimum hash information arrays of the first and second sets and the respective contributor count arrays of the first and second sets; and generate a contributor count array for the derived set, wherein an entry at a particular index in the generated contributor count array is indicative of a count of child sets of the derived set whose minimum hash information array meets a criterion with respect to an entry at the particular index in the minimum hash information array for the derived set.

9. The system of claim 8, wherein the set operation is one of a union operation or a set difference operation.

10. The system of claim 8, wherein the similarity score for the first and second sets is a Jaccard similarity score.

11. The system of claim 8, wherein to generate the derived set the similarity analysis task is further configured to:

determine a first number of elements of the contributor count array of the first set for which the contributor count is non-zero and a corresponding contributor count of the contributor count array of the second set is also non-zero;

determine a second number of elements of the contributor count array of the first set for which the contributor count is zero and a corresponding minimum hash value of the hash information array of the first set exceeds the corresponding minimum hash value of the hash information array of the second set; and divide a positive integer by a sum of at least the first number and the second number to determine the similarity score.

12. The system of claim 8, wherein a particular entry of the minimum hash information array of the derived set indicates a bound for a minimum hash value associated with a hash function and the derived set.

13. The system of claim 12, wherein the particular entry of the minimum hash information array of the derived set is stored at a first index within the minimum hash information array of the derived set, and wherein to generate the derived set the similarity analysis task is configured to determine that the bound is to be stored at the first index based at least in part on determining that an entry at the first index in the contributor count array of the derived set indicates a zero contributor count.

14. The system of claim 8, wherein generating the derived set is performed for individual ones of a plurality of iterations of a similarity analysis task.

15. One or more non-transitory computer-accessible storage media storing program instructions that when executed on or across one or more processors cause one or more computer systems to implement:

obtaining a plurality of sets individually representing one or more data entities, wherein individual sets of the plurality of sets respectively comprise;

a contributor count array comprising respective counts of child sets; and a minimum hash information array generated without applying a hash function;

generating a derived set from the plurality of obtained sets, wherein the generating comprises:

identifying, from the plurality of sets, a first set and a second set according to respective similarity scores for the first and second sets, the respective similarity scores determined according to the respective minimum hash information arrays and the respective contributor count arrays of the first and second sets without applying a hash function to the first and second sets;

applying a set operation to the identified first and second sets to determine the derived set;

generating a minimum hash information array for the derived set without applying a hash function, the generating performed according to the respective minimum hash information arrays of the first and second sets and the respective contributor count arrays of the first and second sets; and generating a contributor count array for the derived set, wherein an entry at a particular index in the generated contributor count array is indicative of a count of child sets of the derived set whose minimum hash information array meets a criterion with respect to an entry at the particular index in the minimum hash information array for the derived set.

16. The one or more non-transitory computer-accessible storage media as recited in claim 15, wherein the set operation is one of a union operation or a set difference operation.

17. The one or more non-transitory computer-accessible storage media as recited in claim 15, wherein the similarity score for the first and second sets is a Jaccard similarity score.

18. The one or more non-transitory computer-accessible storage media as recited in claim 15, wherein the generating further comprises:

determining a first number of elements of the contributor count array of the first set for which the contributor count is non-zero and a corresponding contributor count of the contributor count array of the second set is also non-zero;

determining a second number of elements of the contributor count array of the first set for which the contributor count is zero and a corresponding minimum hash value of the hash information array of the first set exceeds the corresponding minimum hash value of the hash information array of the second set; and dividing a positive integer by a sum of at least the first number and the second number to determine the similarity score.

19. The one or more non-transitory computer-accessible storage media as recited in claim 15, wherein a particular entry of the minimum hash information array of the derived set indicates a bound for a minimum hash value associated with a hash function and the derived set, wherein the particular entry of the minimum hash information array of the derived set is stored at a first index within the minimum hash information array of the derived set, and wherein the generating further comprises determining that the bound is to be stored at the first index based at least in part on determining that an entry at the first index in the contributor count array of the derived set indicates a zero contributor count.

20. The one or more non-transitory computer-accessible storage media as recited in claim 15, wherein generating the derived set is performed for individual ones of a plurality of iterations of a similarity analysis task.

* * * * *